United States Patent
Luttrell, Jr. et al.

(10) Patent No.: US 12,524,785 B2
(45) Date of Patent: Jan. 13, 2026

(54) CONTENT MANAGEMENT SYSTEMS, METHODS, AND MEDIA USING AN APPLICATION LEVEL FIREWALL

(71) Applicant: Integral Ad Science, Inc., New York, NY (US)

(72) Inventors: David Luttrell, Jr., Philadelphia, PA (US); Alan Murray, New York, NY (US); Christopher L. Chapman, New York, NY (US)

(73) Assignee: Integral Ad Science, Inc., New York, NY (US)

( * ) Notice: Subject to any disclaimer, the term of this patent is extended or adjusted under 35 U.S.C. 154(b) by 0 days.

(21) Appl. No.: 18/779,357

(22) Filed: Jul. 22, 2024

(65) Prior Publication Data
US 2025/0200616 A1    Jun. 19, 2025

Related U.S. Application Data

(63) Continuation of application No. 14/069,583, filed on Nov. 1, 2013, now Pat. No. 12,045,863, which is a
(Continued)

(51) Int. Cl.
*G06Q 30/0241* (2023.01)
*G06Q 30/02* (2023.01)

(52) U.S. Cl.
CPC ......... *G06Q 30/0277* (2013.01); *G06Q 30/02* (2013.01)

(58) Field of Classification Search
CPC .................... G06Q 30/0277; G06Q 30/02
(Continued)

(56) References Cited

U.S. PATENT DOCUMENTS 7,606,810 B1 * 10/2009 Jeavons ............... G06Q 30/02
                                                      707/999.005
7,697,791 B1    4/2010 Chan et al.
(Continued)

FOREIGN PATENT DOCUMENTS

WO    WO 2007/002785          1/2007
WO    WO-2007002785 A2 *    1/2007 ......... G06Q 30/0265

OTHER PUBLICATIONS

IASH Code of Conduct v10.2, Jul. 2010, 16 pages (Year: 2010).*
(Continued)

*Primary Examiner* — James D Nigh
(74) *Attorney, Agent, or Firm* — Byrne Poh LLP (57) ABSTRACT

Content management systems, methods, and media using an application level firewall are provided. In accordance with some embodiments of the disclosed subject matter, the system for managing advertisement adjacencies comprises: a firewall component in an application layer comprising a processor and a memory, wherein the firewall component is configured to operate in an advertisement call stack of the application layer and wherein the processor is programmed to: receive an advertisement call for publishing an advertisement in an advertisement server on a web page, wherein a verification tag is inserted in the advertisement call that redirects the advertisement call to the firewall component prior to transmission to the advertisement server; determine whether the web page associated with the advertisement call contains objectionable content; and, in response to determining that the web page does not contain objectionable content, transmit the advertisement call to the advertisement server for publishing the advertisement on the web page.

19 Claims, 5 Drawing Sheets

Related U.S. Application Data continuation of application No. 12/869,655, filed on Aug. 26, 2010, now Pat. No. 8,595,072.

(60) Provisional application No. 61/237,536, filed on Aug. 27, 2009.

(58) Field of Classification Search
USPC .......................................................... 705/50
See application file for complete search history.

(56) References Cited

U.S. PATENT DOCUMENTS

| | | | | |
|---|---|---|---|---|
| 8,595,186 | B1* | 11/2013 | Mandyam | G06F 8/38 717/178 |
| 10,706,440 | B2* | 7/2020 | Bosco | G06Q 30/02 |
| 2003/0093790 | A1 | 5/2003 | Logan et al. | |
| 2007/0005417 | A1* | 1/2007 | Desikan | G06Q 30/0241 705/14.49 |
| 2008/0098420 | A1 | 4/2008 | Khivesara et al. | |
| 2008/0154717 | A1* | 6/2008 | Saifee | G06Q 30/0263 705/14.69 |
| 2009/0171948 | A1 | 7/2009 | Solomon et al. | |
| 2009/0197581 | A1* | 8/2009 | Gupta | G06Q 30/02 455/414.2 |
| 2010/0250331 | A1* | 9/2010 | Devaraj | G06Q 30/02 705/7.41 |
| 2010/0250714 | A1* | 9/2010 | Wehmann | G06F 21/6254 705/7.31 |
| 2010/0293063 | A1* | 11/2010 | Atherton | G06Q 30/02 705/14.73 |
| 2011/0047006 | A1 | 2/2011 | Attenberg et al. | |

OTHER PUBLICATIONS

IASH Code, "IASH Code of Conduct v10.2", Technical Report, Internet Advertising Sales Houses, Jul. 2010, pp. 1-16.
Netlingo, "Weblet", pp. 1, available at: http://www.netlingo.com/word/weblet.php, last accessed Aug. 27, 2016.
Notice of Allowance dated Jan. 18, 2024 in U.S. Appl. No. 14/069,643, pp. 1-11.
Notice of Allowance dated Feb. 21, 2024 in U.S. Appl. No. 14/069,605, pp. 1-9.
Notice of Allowance dated Mar. 15, 2024 in U.S. Appl. No. 14/069,583, pp. 1-9.
Notice of Allowance dated Jul. 22, 2013 in U.S. Appl. No. 12/869,655, pp. 1-30.
Office Action dated Jan. 25, 2021 in U.S. Appl. No. 14/069,583, pp. 1-52.
Office Action dated Jan. 25, 2021 in U.S. Appl. No. 14/069,605, pp. 1-39.
Office Action dated Jan. 25, 2021 in U.S. Appl. No. 14/069,643, pp. 1-47.
Office Action dated Feb. 28, 2019 in U.S. Appl. No. 14/069,583, pp. 1-50.
Office Action dated Feb. 28, 2019 in U.S. Appl. No. 14/069,605, pp. 1-44.
Office Action dated Feb. 28, 2019 in U.S. Appl. No. 14/069,643, pp. 1-45.
Office Action dated Mar. 25, 2022 in U.S. Appl. No. 14/069,583, pp. 1-39.
Office Action dated Mar. 25, 2022 in U.S. Appl. No. 14/069,605, pp. 1-72.
Office Action dated Mar. 25, 2022 in U.S. Appl. No. 14/069,643, pp. 1-38.
Office Action dated Apr. 6, 2017 in U.S. Appl. No. 14/069,583, pp. 1-32.
Office Action dated Apr. 10, 2017 in U.S. Appl. No. 14/069,643, pp. 1-40.
Office Action dated Apr. 15, 2022 in U.S. Appl. No. 14/069,583, pp. 1-19.
Office Action dated Apr. 15, 2022 in U.S. Appl. No. 14/069,605, pp. 1-17.
Office Action dated Apr. 15, 2022 in U.S. Appl. No. 14/069,643, pp. 1-18.
Office Action dated Apr. 20, 2017 in U.S. Appl. No. 14/069,605, pp. 1-35.
Office Action dated Jun. 11, 2020 in U.S. Appl. No. 14/069,583, pp. 1-54.
Office Action dated Jun. 20, 2013 in U.S. Appl. No. 12/869,655, pp. 1-21.
Office Action dated Jun. 22, 2018 in U.S. Appl. No. 14/069,583, pp. 1-49.
Office Action dated Jun. 24, 2020 in U.S. Appl. No. 14/069,605, pp. 1-44.
Office Action dated Jun. 25, 2020 in U.S. Appl. No. 14/069,643, pp. 1-48.
Office Action dated Jun. 28, 2018 in U.S. Appl. No. 14/069,643, pp. 1-50.
Office Action dated Jul. 6, 2018 in U.S. Appl. No. 14/069,605, pp. 1-46.
Office Action dated Sep. 1, 2016 in U.S. Appl. No. 14/069,643, pp. 1-48.
Office Action dated Sep. 9, 2016 in U.S. Appl. No. 14/069,583, pp. 1-47.
Office Action dated Sep. 26, 2016 in U.S. Appl. No. 14/069,605, pp. 1-32.
Office Action dated Oct. 18, 2023 in U.S. Appl. No. 14/069,583, pp. 1-19.
Office Action dated Oct. 26, 2023 in U.S. Appl. No. 14/069,605, pp. 1-36.
Office Action dated Nov. 9, 2012 in U.S. Appl. No. 12/869,655, pp. 1-27.
Office Action dated Nov. 15, 2022 in U.S. Appl. No. 14/069,583, pp. 1-15.
Office Action dated Nov. 15, 2022 in U.S. Appl. No. 14/069,605, pp. 1-14.
Office Action dated Nov. 16, 2022 in U.S. Appl. No. 14/069,643, pp. 1-14.
Techopedia, "What does URL redirect mean?", pp. 1-3, available at: https://www.techopedia.com/definition/1708/url-redirect, last accessed Mar. 27, 2017.
Webopedia, "Microsite", pp. 1-2, available at: http://www.webopedia.com/TERM/M/microsite.html, last accessed Aug. 27, 2016.
Webopedia, "Subdomain", pp. 1-2, available at: http://www.webopedia.com/TERM/S/subdomain.html, last accessed Aug. 27, 2016.
WhatIs, "Sitelet", pp. 1, available at: http://searchsoa.techtarget.com/definition/sitelet, last accessed Aug. 27, 2016.
Wiktionary, "Sitelet", pp. 1, available at: https://en.wiktionary.org/wiki/sitelet, last accessed Aug. 27, 2016.

* cited by examiner

CONTENT MANAGEMENT SYSTEMS, METHODS, AND MEDIA USING AN APPLICATION LEVEL FIREWALL

CROSS-REFERENCE TO RELATED APPLICATIONS

This application is a continuation of U.S. patent application Ser. No. 14/069,583, filed Nov. 1, 2013, which is a continuation of U.S. patent application Ser. No. 12/869,655, filed Aug. 26, 2010, which claims the benefit of U.S. Provisional Patent Application No. 61/237,536, filed Aug. 27, 2009, each of which is hereby incorporated by reference herein in its entirety.

FIELD OF THE INVENTION

The disclosed subject matter generally relates to content management systems, methods, and media using an application level firewall. More particularly, the disclosed subject matter relates to redirecting an advertisement call to an application level firewall component, where the firewall component determines whether a webpage or website contains objectionable content prior to publishing an advertisement on the webpage or website.

BACKGROUND OF THE INVENTION

Media content, such as advertisements, is created with the goal of having the content viewed, listened to, or otherwise received by a target audience. The target audience may be, for example, one or more users with a set of particular interests or one or more of users falling in a particular demographic or psychographic group. However, distributing such media content to the desired audience is a difficult process. It is often difficult for brand managers, ad networks, publishers, advertisers, and/or advertising agencies (collectively referred to herein as "advertisers") to control and manage the service of their advertisements. More particularly, these advertisers lack control over the distribution of their advertisements and are generally concerned with the quality of the content (e.g., web content, web page, the overall web site, etc.) with which they are displayed.

In a more particular example, advertisers may juxtapose advertisements with undesirable or objectionable content due both to the opacity of the ad-placement process and possibly to a misalignment of incentives in the ad-serving ecosystem. Currently, neither the ad network nor the brand can recognize efficiently whether a site contains or has a tendency to contain questionable or objectionable content and control the placement of their advertisements with these sites.

There is therefore a need in the art for approaches for controlling and managing the distribution of advertisements for publications on web pages and web sites. Accordingly, it is desirable to provide methods, systems, and media that overcome these and other deficiencies of the prior art.

For example, the disclosed subject matter provides advertisers, agencies, advertisement networks, advertisement exchanges, and publishers with a measurement of content quality and brand appropriateness. In a more particular example, using threshold information from a brand manager or an advertiser, the application level firewall component can inhibit advertisements from appearing on sites with objectionable content, barred content, or any other suitable unqualified rating.

SUMMARY OF THE INVENTION

In accordance with various embodiments, content management mechanisms using an application level firewall are provided.

In accordance with some embodiments of the disclosed subject matter, an application level firewall component (sometimes referred to herein as "the firewall" or "the system") is provided. The firewall component, among other things, is integrated into an advertisement or content serving environment by inserting redirection instructions and/or any other suitable advertisement verification tags into advertisement calls. Upon receiving the redirected advertisement call, the firewall component verifies the website associated with the advertisement call. The advertisement call is then either passed to a creative server for publishing the corresponding advertisement to the website or returned to the advertisement network.

If an advertisement call is returned to the advertisement network, the same impression (e.g., an advertisement view, a single advertisement that appears on a page when displayed on a viewer's display) can be used by another advertiser with an appropriate threshold. For example, another advertiser that has different thresholds such that the website is not deemed to be barred or objectionable can use the same impression to publish an advertisement on a page.

Content management systems, methods, and media using an application level firewall are provided. In accordance with some embodiments of the disclosed subject matter, the system for managing advertisement adjacencies comprises: a firewall component in an application layer comprising a processor and a memory, wherein the firewall component is configured to operate in an advertisement call stack of the application layer and wherein the processor is programmed to: receive an advertisement call for publishing an advertisement in an advertisement server on a web page, wherein a verification tag is inserted in the advertisement call that redirects the advertisement call to the firewall component prior to transmission to the advertisement server; determine whether the web page associated with the advertisement call contains objectionable content; and, in response to determining that the web page does not contain objectionable content, transmit the advertisement call to the advertisement server for publishing the advertisement on the web page.

In some embodiments, the verification tag includes a plurality of parameters. The plurality of parameters can includes at least one of: a brand threshold value associated with the advertisement call, an identification parameter identifying parties related to the advertisement call, a reporting parameter, a content parameter, a network guidelines parameter, a log information parameter, a targeting parameter, a firewall behavior parameter, and a tracking parameter.

In some embodiments, the system further comprises a rating database. Using the rating database, the processor is further programmed to: determine a rating for the web page using information stored in the rating database, and compare the rating for the web page with the brand threshold value to determine whether the web page associated with the advertisement call contains objectionable content. Using the rating database, the processor is further programmed to compare the web page identified in the advertisement call with content specifications applied by the rating database, where the content specifications are in accordance with an extrinsic standard. The extrinsic standard can be assigned by one of: ABCe, the Joint Industry Committee for Web Standards, and the Internet Advertising Sale Houses, and the Internet Advertising Bureau.

In some embodiments, the processor is further programmed to: determine a sitelet that the web page belongs, where the rating database divided pages into sitelets having a subset of web pages; retrieve a sitelet score associated with the sitelet from the rating database; and determine whether the web page contains objectionable content based at least in part on the sitelet score.

In some embodiments, an impression of the advertisement associated with the advertisement call can be used by another advertiser for publication on another web page in response to determining that the web page contains objectionable content.

In some embodiments, the advertisement call is transmitted back to an advertisement network in response to determining that the web page contains objectionable content.

In some embodiments, an audit report based at least in part on the determination can be generated. The audit report can include at least one of: advertisement serving performance, advertisement placement information, and publisher information.

In some embodiments, a method for managing advertisement adjacencies is provided, the method comprising: providing a firewall component in an application layer comprising a processor and a memory, wherein the firewall component is configured to operate in an advertisement call stack of the application layer; receiving, at the firewall component, an advertisement call for publishing an advertisement in an advertisement server on a web page, wherein a verification tag is inserted in the advertisement call that redirects the advertisement call to the firewall component prior to transmission to the advertisement server; determining, at the firewall component, whether the web page associated with the advertisement call contains objectionable content; and, in response to determining that the web page does not contain objectionable content, transmitting the advertisement call from the firewall component to the advertisement server for publishing the advertisement on the web page.

In some embodiments, a non-transitory computer-readable medium containing computer-executable instructions that, when executed by a processor, cause the processor to perform a method for managing advertisement adjacencies, the method comprising: providing a firewall component in an application layer comprising a processor and a memory, wherein the firewall component is configured to operate in an advertisement call stack of the application layer; receiving, at the firewall component, an advertisement call for publishing an advertisement in an advertisement server on a web page, wherein a verification tag is inserted in the advertisement call that redirects the advertisement call to the firewall component prior to transmission to the advertisement server; determining, at the firewall component, whether the web page associated with the advertisement call contains objectionable content; and, in response to determining that the web page does not contain objectionable content, transmitting the advertisement call from the firewall component to the advertisement server for publishing the advertisement on the web page.

BRIEF DESCRIPTION OF THE DRAWINGS

Various objects, features, and advantages of the disclosed subject matter can be more fully appreciated with reference to the following detailed description of the invention when considered in connection with the following drawing, in which like reference numerals identify like elements.

DETAILED DESCRIPTION OF THE INVENTION

In accordance with some embodiments of the disclosed subject matter, an application level firewall component is provided. The firewall component, among other things, is integrated into an advertisement or content serving environment by inserting redirection instructions and/or any other suitable advertisement verification tag into advertisement calls.

Generally speaking, an advertisement call, prior to modification with redirection instructions, is an instruction to an advertisement server, a creative server, or any other suitable processing device, where the instruction includes a request for a particular advertisement for publication or presentation on a particular web page and identifying information for the web page. In some embodiments, the advertisement can also include requirements, such as the size of the advertisement.

Upon receiving the redirected advertisement call, the firewall component verifies the website associated with the advertisement call. The advertisement call is then either passed to a creative server for publishing the corresponding advertisement to the website or returned to the advertisement network.

If an advertisement call is returned to the advertisement network, the same impression (e.g., an advertisement view, a single advertisement that appears on a page when displayed on a viewer's display) can be used by another advertiser with an appropriate threshold. For example, another advertiser that has different thresholds such that the website is not deemed to be barred or objectionable can use the same impression to publish an advertisement on a page.

The application level firewall can be used in many applications. For example, the firewall component ensures that advertisements from advertisement networks are not served on web pages containing barred content (e.g., Internet Advertising Sales Houses (IASH) barred content). In another example, the firewall component includes reporting features that provide advertisement networks with an indication for the type of content that advertisements have been served adjacent to, publishers in violation of network guidelines, and/or any other suitable information.

Figure 1:
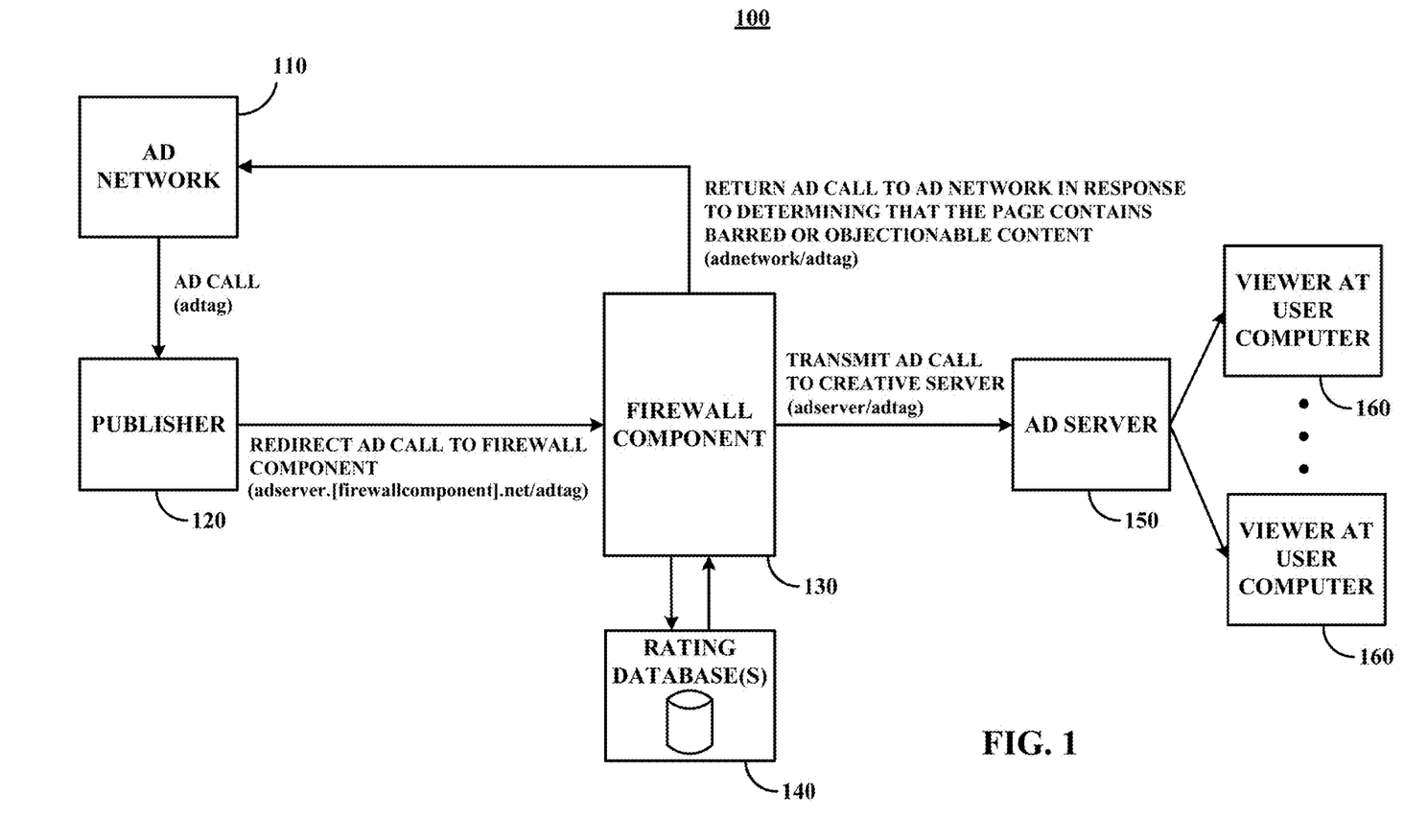
FIG. 1 is a diagram of an example of a process flow for managing advertisement adjacencies in accordance with some embodiments of the disclosed subject matter.

FIG. 1 is a diagram showing an example of a process flow 100 for managing advertisement adjacencies in accordance with some embodiments of the disclosed subject matter. As shown in FIG. 1, process 100 begins by transmitting an advertisement call from an advertisement network 110 to a publisher 120 for associating a particular advertisement or campaign of advertisements with a particular web page. The advertisement call can be any suitable code snippet (e.g., a HyperText Markup Language (HTML) or Javascript code)

from an advertisement network or a publisher to instruct a creative server or any other suitable advertisement server 150 to publish an advertisement on one or more web pages. As shown in FIG. 1, the advertisement call between advertisement network 110 and publisher 120 is represented by "adtag".

As also shown in FIG. 1, publisher 120 at any suitable user computer can insert or append a verification tag or any other suitable code into the advertisement code. For example, the publisher can redirect the advertisement call to a firewall component 130 using a uniform resource locator (URL) redirection instruction into an existing advertisement call and, upon approval by the firewall component 130, can direct the advertisement call to advertisement server 150 for publication. In a more particular example, the advertisement call can be represented by:

"http://adserver.[firewallcomponent]/adtag,"
where [firewallcomponent] is the domain of firewall component 130 appended to the advertisement call. For example, if the domain of firewall component 130 is adsafe.net, the advertisement call can be modified to be "http://adserver.adsafe.net/adtag".

It should be noted that, in some embodiments, in addition to redirecting the advertisement call to the firewall component, the verification tag can include one or more parameters. For example, the one or more parameters can be inserted to indicate at least one of: report type, information type, content type, network guidelines, and log information. That is, the verification tag can include, for example, a request to verify the web page associated with the advertisement call (e.g., 302br.net, 303br.net), parameters for targeting, tracking, and/or reporting (e.g., ?adnetworkparameters), etc.

Figure 2:
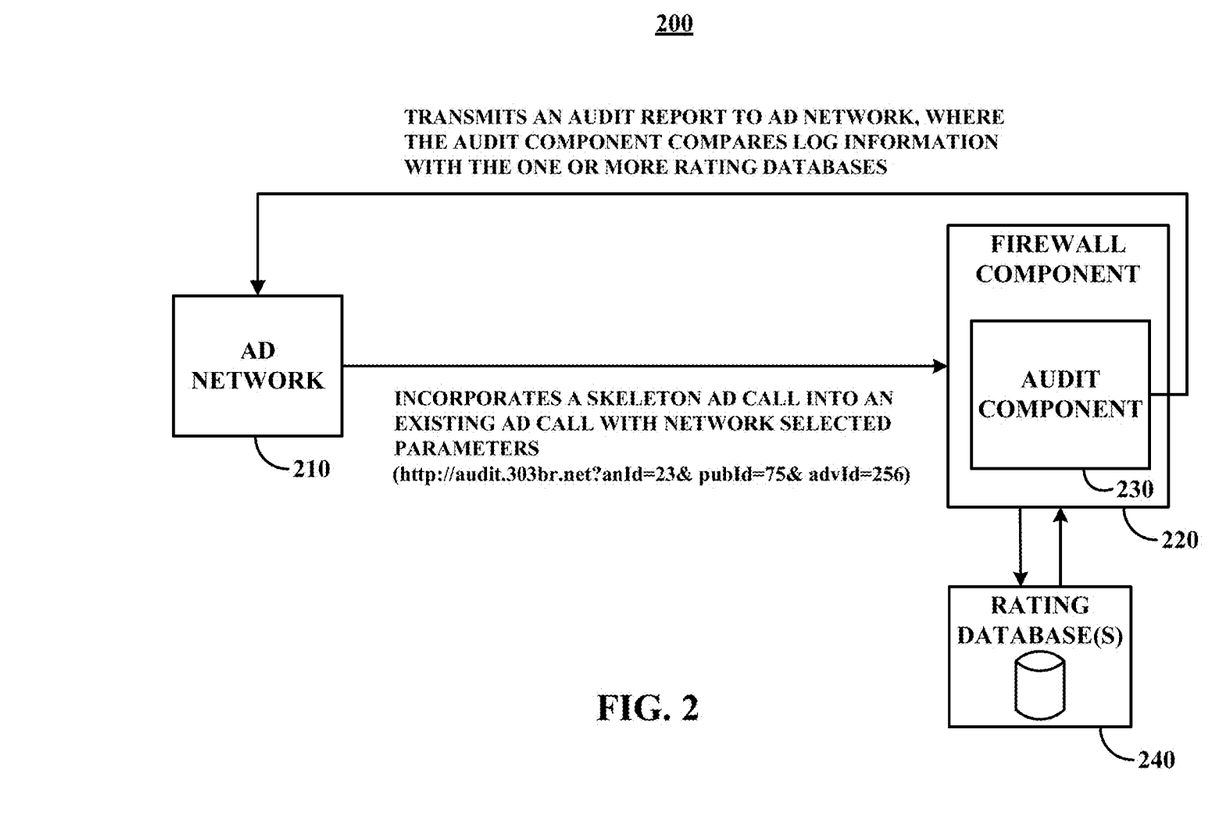
FIG. 2 is a diagram of an example of a process flow for content management reporting features in accordance with some embodiments of the disclosed subject matter.

For example, as shown in FIG. 2, a user, such as an IASH member at an advertisement network 210, appends or inserts a verification tag into an existing advertisement call. For example, the advertisement network incorporates a skeleton ad call into an existing ad call with particular parameters—e.g., http://audit.303br.net?anId=23&pubId=75&advId=256. The parameters, anId=23, pubId=75, and advId=256, are inserted to identify the advertisement network (anId) (e.g., advertisement network 110 of FIG. 1), the publisher (pubId) (e.g., publisher 120 of FIG. 1), and the advertiser (e.g., brand advertiser 310 of FIG. 3). However, it should be noted that any suitable parameter can be inserted into the verification tag, such as advertisement campaign information (e.g., campId), plan information (e.g., planId), channel information (e.g., chanId), placement information (e.g., placementId), referring URL information (e.g., vURL), content type, advertisement type, and/or any other suitable information.

In another suitable example, the verification tag can be an advertisement tag retrieved from the advertisement call, where the advertisement tag is modified to include the redirection instruction and/or parameters. For example, the advertisement tag from the existing advertisement call can be "http://ad.adservingdomain.com/path/query" and, upon appending the redirection to the firewall component and additional parameters, the verification tag can be "http://ad.adservingdomain.com.[parameter1].[parameter2] 0.302br.net/[parameter3]/path/query", where [parameter1], [parameter2], and [parameter3] are multiple parameters inserted into the advertisement call and 302br.net is the redirection to firewall component 130.

It should be noted that parameters can be inserted into the verification tag in any suitable location. For example, the verification tag can include parameters in the hostname, path, and query URL elements that inform firewall component 130 regarding various settings, client requests, firewall behavior modifications, firewall updates, threshold information, etc. For example, a verification tag can be [parameter1].[parameter2]0.302br.net/[parameter3], 1.2.302br.net/jss/.

In some embodiments, multiple entities can append parameters onto the advertisement calls. For example, as shown in FIG. 3, in response to receiving a request for one or more advertisements from one or more publishers 320, the brand advertiser can redirect the existing advertisement call of "http://adservingdomain/creativespecificinfo" to the firewall component through advertisement network 330 by appending the advertisement call with redirection instructions, such as "http://adservingdomain.302br.net/creativespecificinfo." Advertisement network 330 can then append additional parameters onto the advertisement call, such as "http://adservingdomain.302br.net/creativespecificinfo?adnetworkparameters." Such parameters can be used to provide additional information for advertisement targeting, tracking, and/or reporting.

Figure 3:
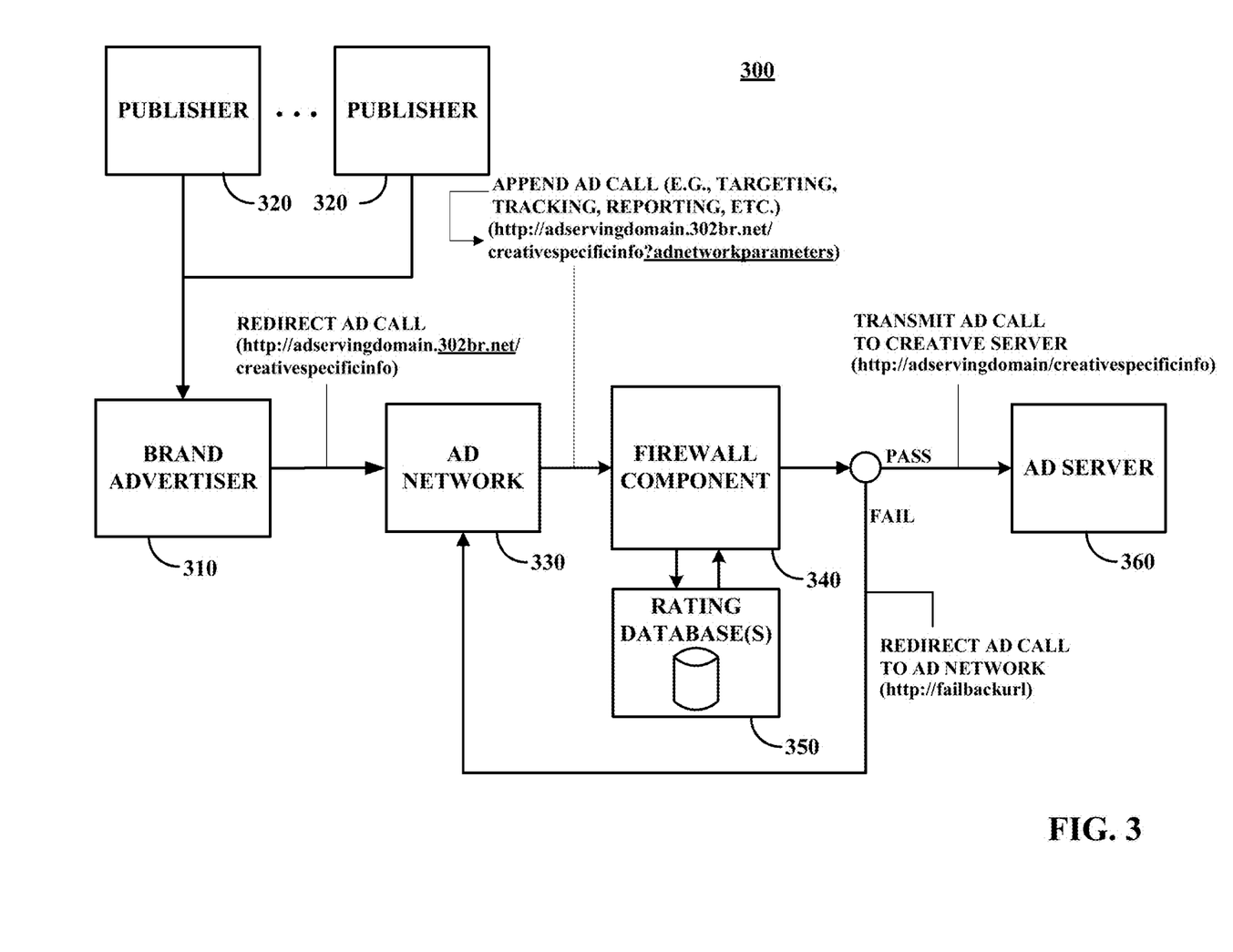
FIG. 3 is a diagram of another example of a process flow for managing advertisement adjacencies in accordance with some embodiments of the disclosed subject matter.

It should be noted that, in process flows 100, 200, and 300 of FIGS. 1-3, some steps can be added, some steps may be omitted, the order of the steps may be re-arranged, and/or some steps may be performed simultaneously.

It should also be noted that, although it is generally described herein as the advertisement network that appends the advertisement call with the verification tag, any suitable entity can append the advertisement call. For example, in some embodiments, the brand manager or advertisement agency inserts redirection instructions into advertisement calls.

Referring back to FIG. 1, in response to receiving the redirected advertisement call, the firewall component 130 determines whether the web page associated with the advertisement call contains barred or objectionable content in relation to the advertisement. It should also be noted that firewall component 130 acts as an intermediary between advertisement network 110 and creative advertisement server 150, thereby ensuring that advertisements passing through firewall component 130 are not served on web pages containing objectionable and/or barred content. Moreover, firewall component 130 ensures that identified inappropriate content adjacencies are avoided and brand equity is protected.

In some embodiments, firewall component 130 determines the web page associated with the advertisement call (e.g., from identifying information in the advertisement call) and uses one or more rating databases 140 to determine whether the web page contains barred or objectionable content. More particularly, a brand manager, advertisement network 110, publisher 120, and/or any other suitable entity can assign a particular content rating threshold to the advertisement call. Firewall component 130 can receive the content rating threshold as a portion of the advertisement call (e.g., part of the verification tag) and determine whether the web page associated with the advertisement call contains barred or objectionable content above or below the content rating threshold.

Approaches for rating websites for safe advertising are further described in, for example, Attenberg et al., U.S. patent application Ser. No. 12/859,763, filed Aug. 19, 2010, which is incorporated by reference herein in its entirety. In particular, rating database 140 or any other suitable component of the system can transmit a request to a rating application that calculates a rating or score for a particular web page. In response, firewall component 130 can determine whether the received rating or score falls within the content rating threshold. In a more particular example, a brand manager can assign a content rating threshold of 800, on a scale of 0-1000, such that the advertisement is published only on pages that are highly likely to not contain objectionable or barred content. If a rating application determines that, on the same scale of 0-1000, a particular page in the category of adult content and offensive language receives a score of 550, the advertisement call is returned to advertisement network 110.

Alternatively, in some embodiments, rating database 140 can generate a score for the web page associated with the advertisement call and compares the score with the content rating threshold. For example, a rating threshold from the one or more parameters in the verification tag with rating information stored in rating database 140. The rating information stored in rating database 140 can based on one or more content specification. The one or more content specifications can include, for example, ABCe data, Internet Advertising Sales Houses (IASH) specifications, Joint Industry Committee for Web Standards (JICWEBS) specifications, Internet Advertising Bureau specifications, etc. In some embodiments, content specifications for determining barred or objectionable content can include specifications relating to one or more of: obscene content, indecent content, hate content, spyware, malware, invalid clicks, unauthorized code requests, violent content, content relating to weapons, and content relating to illegal activities.

In some embodiments, rating database 140 can use content specifications stored in the rating database to analyze the web page. For example, firewall component 130 and/or rating database 140 can analyze the web page associated with the advertisement call to determine whether the web page contains barred or objectionable content in accordance with extrinsic standards by ABCe, IASH, JICWEBS, the Internet Advertising Bureau, etc. In another example, firewall component 130 and/or rating database 140 can transmit identifying information relating to the web page and one or more extrinsic standards (e.g., particular rules from the extrinsic standards) to a rating application for analyzing the web page.

In some embodiments, rating database 140 can include a list of pages or websites that include particular categories of objectionable content. For example, these categories can include content that relates to guns, bombs, and/or ammunition (e.g., sites that describe or provide information on weapons including guns, rifles, bombs, and ammunition, sites that display and/or discuss how to obtain weapons, manufacture of weapons, trading of weapons (whether legal or illegal), sites which describes or offer for sale weapons including guns, ammunition, and/or firearm accessories, etc.). In another example, these categories can include content relating to alcohol (e.g., sites that provide information relating to alcohol, sites that provide recipes for mixing drinks, sites that provide reviews and locations for bars, etc.), drugs (e.g., sites that provide instructions for or information about obtaining, manufacturing, or using illegal drugs), and/or tobacco (e.g., sites that provide information relating to smoking, cigarettes, chewing tobacco, pipes, etc.). In yet another example, these categories can include offensive language (e.g., sites that contain swear words, profanity, hard language, inappropriate phrases and/or expressions), hate speech (e.g., sites that advocate hostility or aggression towards individuals or groups on the basis of race, religion, gender, nationality, or ethnic origin, sites that denigrate others or justifies inequality, sites that purport to use scientific or other approaches to justify aggression, hostility, or denigration), and/or obscenities (e.g., sites that display graphic violence, the infliction of pain, gross violence, and/or other types of excessive violence). In another example, these categories can include adult content (e.g., sites that contain nudity, sex, use of sexual language, sexual references, sexual images, and/or sexual themes). In another example, these categories can include spyware or malicious code (e.g., sites that provide instructions to practice illegal or unauthorized acts of computer crime using technology or computer programming skills, sites that contain malicious code, etc.) or other illegal content (e.g., sites that provide instructions for threatening or violating the security of property or the privacy of others, such as theft-related sites, locking picking and burglary-related sites, fraud-related sites).

In some embodiments, rating database 140 and/or any other suitable component can determine whether a web page or an entire website includes objectionable or barred content. In some embodiments, rating database 140 can use sitelets, where the plurality of web pages that comprise the World Wide Web can be divided into sitelets.

For example, a sitelet can include a URL snippet that received traffic greater than a particular threshold value (e.g., a predetermined threshold of traffic in a given day). In addition, historical page data can be gathered and summarized into the appropriate sitelet.

In another example, a sitelet can be generated that includes a URL snippet that contains web pages and other URLs that have similar ratings. That is, using sitelets, firewall component 130 and its rating database 140 can provide brand managers, advertisers, advertisement agencies, and other entities with substantial coverage of the World Wide Web without the need to store each individual page and/or rating information relating to each individual page.

In connection with sitelets, firewall component 130 can accept a request, where the request includes the appended verification tag, and compare the request and its associated parameters with rating database 140 that includes sitelet scores, brand risk thresholds along multiple categories, etc. For example, firewall component 130 and/or rating database 140 can determine which sitelet the web page associated with the advertisement call belong to, retrieve the parameters including threshold values, and compare the threshold values with the sitelet scores in rating database 140.

Additionally or alternatively, while the embodiments described herein generally determine whether the web page contains content appropriate for publication adjacent an advertisement, firewall component 130 can determine whether the advertisement is appropriate for publication on a particular website. For example, in some embodiments, a publisher 120 having a website—www.website.com—can request that firewall component 130 determines whether advertisements from advertisement server 150 are suitable for publication on their website. Similarly, publisher 120 can transmit a request to firewall component 130, where firewall component 130 along with its rating databases 140 determine whether the advertisement contains objectionable or barred content. In a more particular example, firewall component 130 can determine an objectionability score for the advertisement and compare it with a threshold score from publisher 120. In another example, firewall component 130 can analyze the advertisement (e.g., image analysis, text analysis, etc.) and, based on the analysis, determine whether the advertisement contains barred information in accordance with specifications by ABCe, Internet Advertising Sales Houses (IASH), and/or the Joint Industry Committee for Web Standards (JICWEBS).

Referring back to FIG. 1, in response to determining that the website associated with the advertisement call does not meet the content rating threshold (e.g., the website contains barred or objectionable content, the website is likely to contain barred or objectionable content in the future, the website is not IASH compliant, etc.), firewall component 130 can redirect and transmit the advertisement call to the advertisement network 110, where the advertisement call originated. In addition, the firewall component 130 can indicate to advertisement network 110, publisher 120, or any other suitable entity that the advertisement was not published because the website or web page associated with the advertisement call contained barred or objectionable content.

For example, as shown in FIG. 3, in response to determining that the web page is not acceptable (e.g., contains barred content), the failed ad call may be redirected back to advertisement network 330 or any other suitable entity. In particular, the ad call of "http://adservingdomain.302br.net/creativespecificinfo?adnetworkparameters" can be modified to become "http://failbackurl", where the failbackurl directs the advertisement call to advertisement network 330.

In some embodiments, if an advertisement call is returned to advertisement network 330, the same impression (e.g., an advertisement view, a single advertisement that appears on a page when displayed on a viewer's display) can be used by another advertiser or advertisement network with an appropriate threshold. For example, another advertiser that has different thresholds such that the website is not deemed to be barred or objectionable can use the same impression to publish an advertisement on a page.

In response to determining that the website associated with the advertisement call meets the content rating threshold (e.g., the website that receives a particular score from a rating application that meets the content rating threshold, the website that is determined to be IASH compliant, etc.), firewall component 130 can direct the advertisement call to an advertisement server 150 of FIG. 1, an advertisement server 360 of FIG. 3, or any other suitable creative server for publishing the advertisement.

It should be noted that, by using URL redirection and scanning the rating database for compliant websites, advertisement call can be verified for publication or presentation to viewers with insubstantial latency.

Referring back to FIG. 1, for advertisement calls passed from firewall component 130 to advertisement server 150, advertisement server 150 publishes the corresponding advertisement on the associated website for viewing by viewers at user computers 160.

In some embodiments, the firewall component described herein can include reporting features. For example, as shown in FIG. 2, firewall component 220 can include an auditing component 230. The auditing component 230 can retrieve information, such as parameters from the advertisement call, and compare the information with rating information in a rating database, such as rating database 240. In a more particular example, firewall component 220 can compare log information and other parameter information from the advertisement call against rating information in rating database 240.

In response, auditing component 230 of firewall component 220 can generate an audit report regarding advertisement serving performance, publisher trends, and/or advertisement placement history. Regarding the verification tag, publishers, brand managers, advertisement networks, and/or any other suitable entity using the application level firewall can insert particular parameters to receive a customized audit report that provides the type of content advertisements that have been served adjacent to, for example, publishers in violation of network guidelines and other information.

For example, in response to including particular publisher parameters, firewall component 220 and/or auditing component 230 compares the log information against rating database 240 and forwards a publisher report to advertisement network 210. For example, an audit report can include information as shown below:

| Publisher ID | Advertiser ID | Adult Score |
|---|---|---|
| 75 | 256 | 0 |
| 79 | 123 | 9 |

It should be noted that any suitable audit report can be generated by firewall component 220. For example, after a particular threshold of advertisement calls are rejected by the firewall component (e.g., first ten, first five for a particular campaign, etc.), firewall component 220 can automatically generate and transmit an audit report to advertisement network 210.

Figure 4:
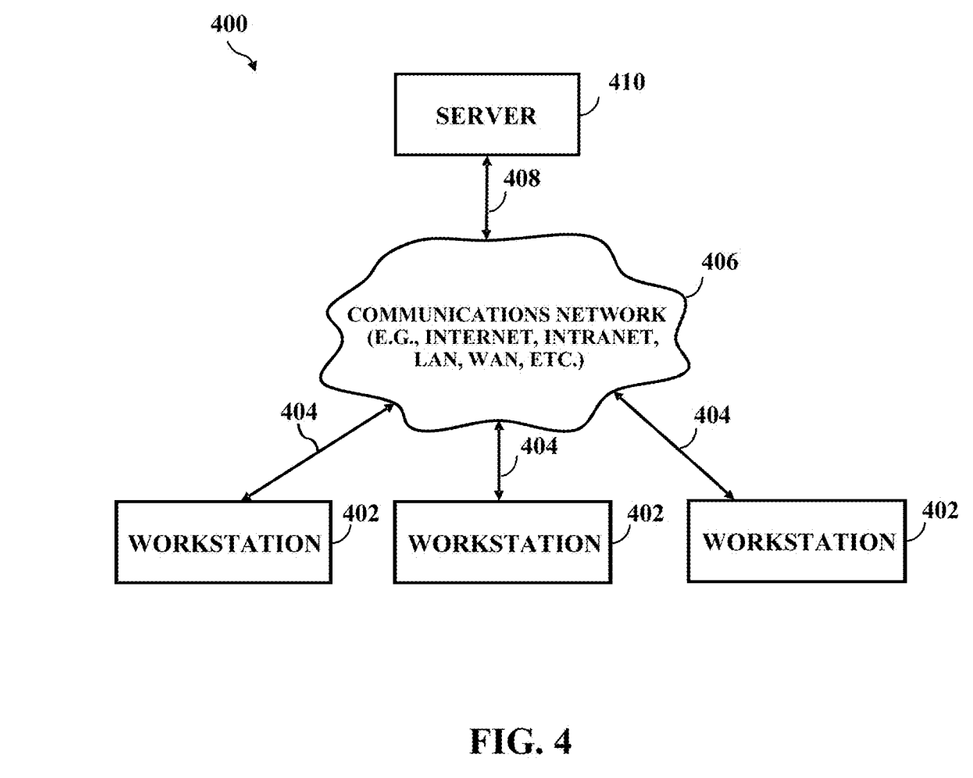
FIG. 4 is a diagram of an illustrative system on which the application level firewall can be implemented in accordance with some embodiments of the disclosed subject matter.

FIG. 4 is a generalized schematic diagram of a system 400 on which the application level firewall component can be implemented in accordance with some embodiments of the disclosed subject matter. As illustrated, system 400 may include one or more user computers 402, such as a user computer at a publisher, a user computer at a brand manager, and/or a user computer at a viewer. User computers 402 may be local to each other or remote from each other. User computers 402 are connected by one or more communications links 404 to a communications network 406 that is linked via a communications link 408 to a server 410.

System 400 may include one or more servers 410. Server 410 may be any suitable server for providing access to the application, such as a processor, a computer, a data processing device, or a combination of such devices. For example, the application can be distributed into multiple backend components and multiple frontend components or interfaces. In a more particular example, backend components, such as data collection and data distribution can be performed on one or more servers 410. Similarly, the graphical user interfaces displayed by the application, such as a data interface and an advertising network interface, can be distributed by one or more servers 410 to user computer 402.

More particularly, for example, each of the client 402 and server 410 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, client 402 can be implemented as a personal computer, a personal data assistant (PDA), a portable email device, a multimedia terminal, a mobile telephone, a set-top box, a television, etc.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Communications network 406 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 404 and 408 may be any communications links suitable for communicating data between user computers 402 and server 410, such as network links, dial-up links, wireless links, hard-wired links, any other suitable communications links, or a combination of such links. User computers 402 enable a user to access features of the application. User computers 402 may be personal computers, laptop computers, mainframe computers, dumb terminals, data displays, Internet browsers, personal digital assistants ("PDAs"), two-way pagers, wireless terminals, portable telephones, any other suitable access device, or any combination of such devices. User computers 402 and server 410 may be located at any suitable location. In one embodiment, user computers 402 and server 410 may be located within an organization. Alternatively, user computers 402 and server 410 may be distributed between multiple organizations.

Figure 5:
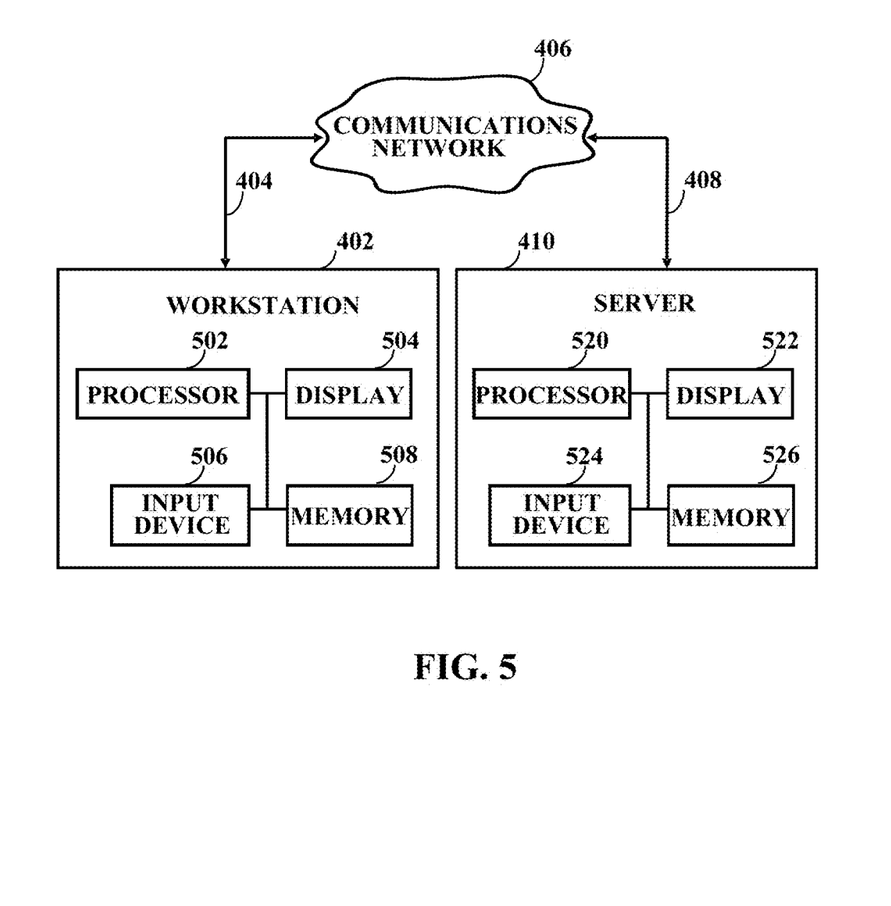
FIG. 5 is a diagram of an illustrative user computer and server as provided, for example, in FIG. 4 in accordance with some embodiments of the disclosed subject matter.

The server and one of the user computers depicted in FIG. 4 are illustrated in more detail in FIG. 5. Referring to FIG. 5, user computer 402 may include processor 502, display 504, input device 506, and memory 508, which may be interconnected. In a preferred embodiment, memory 508 contains a storage device for storing a computer program for controlling processor 502.

Processor 502 uses the computer program to present on display 504 the application and the data received through communications link 404 and commands and values transmitted by a user of user computer 402. It should also be noted that data received through communications link 404 or any other communications links may be received from any suitable source. Input device 506 may be a computer keyboard, a cursor-controller, dial, switchbank, lever, or any other suitable input device as would be used by a designer of input systems or process control systems.

Server 410 may include processor 520, display 522, input device 524, and memory 526, which may be interconnected. In a preferred embodiment, memory 526 contains a storage device for storing data received through communications link 408 or through other links, and also receives commands and values transmitted by one or more users. The storage device further contains a server program for controlling processor 520.

In some embodiments, the application may include an application program interface (not shown), or alternatively, the application may be resident in the memory of user computer 402 or server 410. In another suitable embodiment, the only distribution to user computer 402 may be a graphical user interface ("GUI") which allows a user to interact with the application resident at, for example, server 410.

In one particular embodiment, the application may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a user computer and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Accordingly, systems, content management systems, methods, and media using an application level firewall are provided.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for managing advertisement adjacencies, the method comprising:
    receiving, using a firewall component positioned between an advertisement network that one or more advertisement calls originated and an advertisement server that publishes one or more corresponding content items to a page and is configured to operate in an advertisement call stack of an application layer, wherein the firewall component includes a hardware processor, an advertisement call for publishing a content item on a page;
    determining, using the firewall component, that the page belongs to a pre-defined group of pages, wherein a plurality of pages are divided into a plurality of pre-defined groups of pages and wherein each of the plurality of pre-defined groups of pages includes at least one of the plurality of pages;
    determining, using the firewall component, whether the page is acceptable for publishing the content item from the advertisement server based on the pre-defined group of pages; and
    in response to determining that the page is not acceptable for publishing the content item from the advertisement server, modifying, using the firewall component, the advertisement call to include an indication that the advertisement call was redirected from the advertisement server to the advertisement network.

2. The method of claim 1, wherein the advertisement call is made available for publishing the content item on another page.

3. The method of claim 1, wherein the method further comprises determining a score associated with the pre-defined group of pages, wherein the determination of whether the page is acceptable for publishing the content item from the advertisement server is based on the score.

4. The method of claim 1, wherein the advertisement call includes one or more advertisement parameters, wherein the one or more advertisement parameters include at least one of: a brand threshold value, an objectionable content threshold value, an advertisement network identification parameter, a publisher identification parameter, an advertiser identification parameter, an advertisement campaign parameter, an advertisement placement parameter, a referring URL parameter, a reporting parameter, a content parameter, an advertisement type parameter, a network guidelines parameter, a log information parameter, a targeting parameter, a firewall behavior parameter, and a tracking parameter.

5. The method of claim 4, wherein the pre-defined group of pages includes historical page information and wherein the method further comprises comparing the one or more advertisement parameters with the historical page information and determining whether to transmit the advertisement call based at least in part on the comparison.

6. The method of claim 4, wherein the method further comprises transmitting the advertisement call to an advertisement server for providing the content item to the page in response to determining that the page meets the one or more advertisement parameters.

7. The method of claim 4, wherein the method further comprises transmitting the advertisement call to an advertisement network in response to determining that the page does not meet the one or more advertisement parameters.

8. The method of claim 4, wherein code is placed in the advertisement call that redirects the advertisement call to the firewall component prior to transmission to the advertisement server that retrieves the content item for publication on the page.

9. The method of claim 1, wherein the content item is an advertising content item.

10. A system for managing advertisement adjacencies, the system comprising:
    a firewall component in an application layer comprising a processor and a memory, wherein the firewall component is configured to operate in an advertisement call stack of the application layer and wherein the processor is programmed to:
    receive an advertisement call for publishing a content item on a page;
    determine that the page belongs to a pre-defined group of pages, wherein a plurality of pages are divided into a plurality of pre-defined groups of pages and wherein each of the plurality of pre-defined groups of pages includes at least one of the plurality of pages;
    determine whether the page is acceptable for publishing the content item from the advertisement server based on the pre-defined group of pages; and
    in response to determining that the page is not acceptable for publishing the content item from the advertisement server, modify the advertisement call to include an indication that the advertisement call was redirected from the advertisement server to the advertisement network.

11. The system of claim 10, wherein the advertisement call is made available for publishing the content item on another page.

12. The system of claim 10, wherein the processor is further programmed to determine a score associated with the pre-defined group of pages, wherein the determination of whether the page is acceptable for publishing the content item from the advertisement server is based on the score.

13. The system of claim 10, wherein the advertisement call includes one or more advertisement parameters, wherein the one or more advertisement parameters include at least one of: a brand threshold value, an objectionable content threshold value, an advertisement network identification parameter, a publisher identification parameter, an advertiser identification parameter, an advertisement campaign parameter, an advertisement placement parameter, a referring URL parameter, a reporting parameter, a content parameter, an advertisement type parameter, a network guidelines parameter, a log information parameter, a targeting parameter, a firewall behavior parameter, and a tracking parameter.

14. The system of claim 13, wherein the pre-defined group of pages includes historical page information and wherein the processor is further programmed to compare the one or more advertisement parameters with the historical page information and determine whether to transmit the advertisement call based at least in part on the comparison.

15. The system of claim 13, wherein the processor is further programmed to transmit the advertisement call to an advertisement server for providing the content item to the page in response to determining that the page meets the one or more advertisement parameters.

16. The system of claim 13, wherein the processor is further programmed to transmit the advertisement call to an advertisement network in response to determining that the page does not meet the one or more advertisement parameters.

17. The system of claim 13, wherein code is placed in the advertisement call that redirects the advertisement call to the firewall component prior to transmission to the advertisement server that retrieves the content item for publication on the page.

18. The system of claim 10, wherein the content item is an advertising content item.

19. A non-transitory computer-readable medium containing computer-executable instructions that, when executed by a processor, cause the processor to perform a method for managing advertisement adjacencies, the method comprising:

receiving, using a firewall component positioned between an advertisement network that one or more advertisement calls originated and an advertisement server that publishes one or more corresponding content items to a page and is configured to operate in an advertisement call stack of an application layer, wherein the firewall component includes a hardware processor, an advertisement call for publishing a content item on a page;

determining, using the firewall component, that the page belongs to a pre-defined group of pages, wherein a plurality of pages are divided into a plurality of pre-defined groups of pages and wherein each of the plurality of pre-defined groups of pages includes at least one of the plurality of pages;

determining, using the firewall component, whether the page is acceptable for publishing the content item from the advertisement server based on the pre-defined group of pages; and in response to determining that the page is not acceptable for publishing the content item from the advertisement server, modifying, using the firewall component, the advertisement call to include an indication that the advertisement call was redirected from the advertisement server to the advertisement network.

\* \* \* \* \*